US 6,647,726 B2

(12) United States Patent
Saviharju et al.

(10) Patent No.: US 6,647,726 B2
(45) Date of Patent: Nov. 18, 2003

(54) METHOD AND ARRANGEMENT FOR PRODUCING ELECTRICAL ENERGY AT A PULP MILL

(75) Inventors: Kari Saviharju, Espoo (FI); Jorma Simonen, Alpharetta, GA (US)

(73) Assignee: Andritz Oy, Helsinki (FI)

( * ) Notice: Subject to any disclaimer, the term of this patent is extended or adjusted under 35 U.S.C. 154(b) by 0 days.

(21) Appl. No.: 10/156,640

(22) Filed: May 29, 2002

(65) Prior Publication Data

US 2002/0194849 A1 Dec. 26, 2002

Related U.S. Application Data

(60) Provisional application No. 60/293,526, filed on May 29, 2001.

(51) Int. Cl.[7] .......................... F01K 23/10; D21C 11/12
(52) U.S. Cl. .............................................. 60/653; 60/678
(58) Field of Search ........................ 60/653, 670, 671, 60/651, 677, 678

(56) References Cited

U.S. PATENT DOCUMENTS

| 5,201,172 A | | 4/1993 | Hakulin et al. | |
|---|---|---|---|---|
| 5,370,772 A | | 12/1994 | Arpalahti et al. | |
| 5,775,266 A | | 7/1998 | Ziegler | |
| 5,850,739 A | * | 12/1998 | Masnoi | 60/653 |
| 6,014,863 A | * | 1/2000 | Okusawa et al. | 60/653 |

FOREIGN PATENT DOCUMENTS

| DE | 42 12 524 A1 | 10/1993 | |
|---|---|---|---|
| GB | 707813 | 4/1954 | |
| JP | 54114654 A | * 9/1979 | ............ F01K/17/00 |

* cited by examiner

*Primary Examiner*—Sheldon J. Richter
(74) *Attorney, Agent, or Firm*—Nixon & Vanderhye, P.C.

(57) ABSTRACT

The invention relates to a method and an arrangement in the production of electric energy in a boiler plant of a pulp mill. Black liquor having a dry solids content of more than 80% and combustion air are fed into a furnace of a recovery boiler for combusting black liquor and recovering chemicals contained therein. The flue gases generated in the combustion are led into an economizer of the recovery boiler, in which economizer the feed water for the boiler is heated, and after the economizer to gas cleaning. The feed water is led from the economizer onto the steam-generating bank at a temperature below the saturation temperature and further into a superheater to produce steam having a pressure of more than 80 bar. The steam is led from the recovery boiler to a steam turbine to produce electricity. The temperature of the feed water being led into the economizer is regulated by means of bleed steam of the turbine so that the flue gases exit the economizer at a temperature of more than 250° C. and that after the economizer the flue gases are cleaned in at least a hot electrostatic precipitator and the cleaned flue gases are cooled by the combustion air or the feed water.

14 Claims, 2 Drawing Sheets

METHOD AND ARRANGEMENT FOR PRODUCING ELECTRICAL ENERGY AT A PULP MILL

RELATED APPLICATION

Priority is claimed to U.S. Provisional Patent Application Ser. No. 60/293,526, filed on May 29, 2001, and which is incorporated by reference herein.

BACKGROUND AND SUMMARY OF INVENTION

The present invention relates to a method of producing additional electrical energy in a boiler plant of a pulp mill. Black liquor preferably having a dry solids content of over 80% and combustion air is fed into the furnace of a chemical recovery boiler for burning black liquor and recovering chemicals therefrom. The flue gases generated in the combustion are led to an economizer of the recovery boiler, in which economizer feed water for the boiler is heated, and after the economizer to a device that cleans the flue.

Feed water flows from the economizer to the steam-generating bank of the boiler, and into the superheater for producing steam preferably having a pressure of more than 80 bar. The steam flows from the recovery boiler to a steam turbine for producing electricity. Steam discharging from the turbine is utilized for preheating the feed water flowing to the economizer. In the present application, an economizer is understood as a heat exchanger or plurality of heat exchangers in which thermal energy is transferred from the flue gases to the feed water. The scope of the invention is not limited by the use of this term to any particular design of a gas-to-liquid heat exchanger.

Waste liquor, so-called black liquor is generated when producing chemical pulp in the paper and pulping industry, waste liquor is usually combusted in a boiler recovering chemicals and heat. In a conventional recovery boiler, process chemicals are recovered by spraying the black liquor into the furnace. When being introduced into the furnace, the black liquor dries fast and burns in the beginning under reducing conditions and later under oxidizing conditions in the furnace, whereby flue gases and melt are generated. The melt is discharged from the furnace. The combustion air is fed into the recovery boiler usually at multiple levels so that in the beginning the conditions prevailing are reducing and later oxidizing. In the hot furnace the water, the volatile parts of the dry solid matter and the gasifying parts are evaporated from the liquor drops. The heat contained in the flue gases is recovered by means of heat transfer surfaces inside the boiler, e.g., in the superheater, in the steam-generating bank and in the economizers into the water flowing therein, which water exits the superheater in form of high-pressure steam. The flue gases of the recovery boiler are discharged from the economizer into the gas cleaning device. The ash of the waste liquor droplets, i.e., the inorganic matter in the waste liquor, gathers at the bottom of the boiler, forming a so-called char bed. The char bed is reduced and melted. The melt flows onto the bottom of the furnace, wherefrom it is discharged and introduced back to the digestion process via various process stages.

The production of sulfate pulp is the most important method of producing pulp in the world. During the years, the need for heat and electricity in a sulfate pulp mill has continuously decreased as a result of development work and at present the production of sulfate pulp is more than self-sufficient when energy, or at least process heat, is concerned. Energy is produced in a pulp mill mainly by combustion of black liquor in a recovery boiler and bark and wood wastes in an auxiliary boiler and oil or gas in a lime sludge reburning kiln. The bark of the raw wood material and the organic matter in the black liquor usually cover the whole energy requirement. There are also plants in which wood or bark is used as fuel for the lime reburning kiln, either as such after drying or after drying and gasifying.

At the present time, the production of energy is effected as follows: the recovery boiler and the auxiliary boiler, in which the bark generated in the mill is combusted, produce superheated high-pressure steam. The produced steam is led via one or more back pressure steam turbines and the steam from the discharge end is used to cover the heat requirement of the mill. The turbine and the generator connected thereto produce the electricity needed by the mill. Electricity is usually produced by a back pressure turbine having one or more bleedings. The back pressure used is 3–6 bar (abs.) and the bled pressure 10–16 bar (abs.). The production of electricity may also be effected by means of a condensing turbine. There are also pulp mills devoid of a gas turbine. In such a case the electricity required is supplied from outside the mill.

The recovery boiler has developed to be a reliable process for regeneration and energy production. The ratio of heat and electricity obtained by means of the recovery boiler is disadvantageous in present-day sulfate pulp mills. The heat production need may be covered by the recovery boiler better than before, due to decreased heat consumption by the processes, but the electricity yield as well as the efficiency of condensation solutions is low. Because the flue gas particles of the recovery boiler containing alkalis, sulfur and chlorine are easily fusible and tend to fasten onto the heat transfer surfaces, the recovery boiler has a risk of high-temperature corrosion and clogging. The principal way to avoid corrosion has been to choose the temperature and pressure of the steam produced to be low enough to decrease the detrimental effects of molten salt.

In steam boiler plants, the higher the steam pressure and temperature in the boiler may be raised and the lower the pressure of the steam taken from the turbine to be used for the needs of the mill, the higher the overall electrical efficiency of the plant is, i.e., the ratio between the net production of electric power and the consumption of process heat. There is a need to raise the overall electrical efficiency of the recovery boilers nearer to that of the conventional coal-fired power plants, i.e., the pressure and the temperature of the steam produced by the recovery boilers should be raised to as high a level as possible. In other industrial boilers, the conventional steam pressure/temperature is, e.g., 130 bar/540° C. In primary power plants producing only electricity, the pressure and the temperatures of the steam are even distinctly higher than that, and also intermediate superheating is practiced in them. In recovery boilers, the typical pressure of fresh steam has been 60–90 bar, but nowadays, due to many improvements of apparatuses and processes as well as better materials, significantly higher pressures and temperatures, even e.g., 120 bar and 520° C., may be achieved.

At present, the flue gases being discharged from the economizer of the recovery boiler are cooled by feed water to a temperature of less than 200° C., preferably 150–170° C. Higher final temperatures of flue gases would lead to a lower efficiency due to greater flue gas losses, as, due to impurities contained in the flue gas, the recovery boilers have not been provided with flue gas-heated preheaters of air to decrease the final temperature of the flue gas. The electricity production efficiency of the recovery boiler and the steam turbine assembly might be improved by more effective use of bled steams of the steam turbine for preheating the feed water of the boiler, for preheating the combustion air and for drying the fuel to be burned in the lime reburning kiln or the bark boiler. In conventional power plants, the preheating of the feed water is divided into a low pressure (condensate/additional water) and high-pressure parts, the feed water tank being located at the boundary thereof. In recovery plants, only the feed water tank is used for preheating the feed water. Back pressure production makes the low pressure preheating typically inappropriate and high-pressure preheating raises the temperature of the feed water so that it would lead to increased temperatures of discharging flue gases, which in turn would decrease said efficiency, unless it would be possible to cool the flue gases after the economizer in an economical way.

EP patent 724683 presents an installation of a steam boiler provided with a furnace and a steam turbine, in which the preheating of the feed water for the boiler by means of bleeding steam of the steam turbine has been effected by locating the preheater between two economizers. By this installation, the overall efficiency of electricity production can be increased compared to a situation devoid of preheating. Prior art knows also the method presented in DE patent 2 243 380 to divide the feed water flow to a branch going into the boiler (the economizer) and a branch going to the high-pressure preheating. This arrangement also increases the overall electrical efficiency, but less than the arrangement described in EP patent 724683.

The treating and cooling of flue gases after the economizers are essentially connected with the fact that the flue gases contain various impurities, such as nitrogen oxides. These nitrogen compounds are generated from the thermal oxidizing of the combustion air nitrogen or from oxide produced by the so-called prompt-mechanism as well as the release of fuel-bound nitrogen and the subsequent oxidizing. When black liquor is combusted, the nitrogen contained therein is converted under the reducing conditions in the furnace of the recovery boiler to ammonia and nitrogen compounds entering chemical melt. This ammonia forms molecular nitrogen and nitrogen oxides detrimental for the environment both in conventional combustion and staged oxidation, i.e., when the air is fed in multiple separate stages (so-called low-Nox-combustion). Typically half of said ammonia is converted to nitrogen oxides and the other half to nitrogen gas. By means of the so-called low-Nox-combustion (a staged air-feed when the under-stoichiometric conditions turn to the over-stoichiometric conditions in the final combustion), said conversion of the ammonia to nitrogen oxides may be decreased typically by about 20%, depending on the operation temperature. Although nitrogen oxide release from the recovery boiler may be decreased by utilizing staged combustion, gas cleaning methods after the boiler are also needed in order to decrease the emissions. One of such methods is the catalytic, so-called SCR-process known per se. In this process, ammonia or aqueous ammonia is added into the gases, after which the gas flows passing a catalyst, which catalyzes the SCR-reaction. The nitrogen oxides are removed from the flue gases selectively, i.e., without oxidizing the ammonia and as a result, nitrogen gas and water vapor are obtained. SCR-catalysts are well known per se. The operation temperature of the SCR-process is preferably 300–350° C. (it varies depending on the sources: U.S. Pat. No. 5,853,683: 149–538° C., preferably 232–427° C.; U.S. Pat. No. 5,775,266: 320–350° C.; U.S. Pat. No. 5,132,103: depending on the catalyst 340–450° C.)

An objective of the present invention is to improve the yield i.e. the overall electrical efficiency of the recovery boiler and the steam turbine assembly. The present invention, in one embodiment, is a method in which bled steam of a steam turbine may be used for preheating the feed water of the boiler without disadvantageously affecting said overall electrical efficiency. A further objective of the invention is to improve said overall electrical efficiency so that the flue gases may be cleaned as efficiently as possible to remove impurities contained therein, but simultaneously recovering the thermal energy thereof as efficiently as possible.

To achieve these objectives, the present invention regulates the temperature of the feed water flowing into the economizer by means of bled steam of the turbine so that the flue gases exit the economizer at a temperature of more than 250° C., typically 250–400° C., preferably 300–350° C., and that after the economizer the flue gases are purified in at least a hot electrostatic precipitator and the cleaned flue gases are cooled by the combustion air or the feed water.

According to an embodiment of the invention, the dry solids content of the black liquor to be combusted is raised to a value of more than 80 weight per cent, typically 80–95 weight per cent, preferably 85–90 weight per cent and the combustion is effected by operating with a small amount of excess air. Thus, the flue gas flow of the recovery boiler and the heat capacity flow of the flue gas are reduced, as the water content of the flue gas is lower compared to the case of combusting weaker black liquor. FI patent application 974345 presents a preferred method of evaporating black liquor to a high dry solids content and feeding it into the recovery boiler.

The higher the value (high steam pressure and temperature) of the steam being fed from the boiler to the steam turbine, the more preferable it is for the operation of steam turbine plants. The method according to an embodiment of the invention produces steam having as high value as possibly produced by the recovery boiler in question, taking into account the constructional properties of the boiler.

According to another aspect of the present invention, an arrangement is provided for producing electrical energy in a boiler plant of a pulp mill. The arrangement comprises: a recovery boiler having a furnace for combusting black liquor; conduits for feeding black liquor and combustion air into the furnace; a superheater and a steam discharge line connected to the superheater; an economizer for heating feed water by flue gases and a conduit for introducing feed water into the economizer and a conduit for discharging flue gas from the economizer; a steam turbine connected to the steam discharge line of the boiler and having at least one conduit for discharging bled steam; a preheater for feed water connected to the feed water introduction conduit; a hot electrostatic precipitator having feed and discharge conduits for flue gas; and, a preheater for air connected to the combustion air feed conduit of the furnace. The feed water preheater is connected to the discharge conduit(s) for discharging bled steam or bled steams of the steam turbine, the flue gas feed conduit of the hot electrostatic precipitator is connected to the flue gas discharge conduit of the economizer of the boiler and the preheater for air is connected to the flue gas discharge conduit of the hot electrostatic precipitator.

According to another embodiment of the present invention, an arrangement is provided for producing electrical energy in a boiler plant of a pulp mill. The arrangement comprises: a recovery boiler having a furnace, conduits for feeding black liquor and combustion air into the furnace, a superheater and a steam discharge line connected to the superheater; at least a first and second economizer in the flow direction of the boiler feed water, and a conduit for discharging flue gas from the second economizer; a steam turbine connected to the steam discharge line of the boiler and having at least one conduit for discharging bled steam. A feed water preheater, and a hot electrostatic precipitator having feed and discharge conduits for flue gas. According to this embodiment the feed water preheater is connected to the discharge conduit/s for discharging bled steam or bled steams of the steam turbine and disposed between the first and second economizer so that the feed water flows from the first economizer to the second economizer; the flue gas feed conduit of the hot electrostatic precipitator is connected to the flue gas discharge conduit of the second economizer, and the first economizer is connected to the flue gas discharge conduit of the hot electrostatic precipitator.

A further feature of the invention is that the feed water for the boiler is preheated by means of bled steam of the steam turbine so that the flue gases leave the economizer at a temperature of more than 250° C., preferably at a temperature of 300–350° C. This temperature is essentially higher than the temperature of about 150° C., at which temperature the flue gases are discharged from the economizer to the flue gas cleaning system, as known. Thus, the efficiency of the steam turbine process is increased, as the back pressure steams and bled steams may be efficiently used for preheating the feed water. The high discharge temperature of the flue gases is made possible by locating the hot electrostatic precipitator after the economizer in the flue gas line. The hot electrostatic precipitator, in which ash particles are removed from the flue gas, operates at a temperature of more than 250° C., preferably at 300–350° C. Due to such a high temperature of the flue gas, a so-called SCR-process for removing nitrogen oxides may preferably be installed after the hot electrostatic precipitator. Due to constantly tightening environmental regulations, nitrogen oxides have to be efficiently removed from the flue gases of the recovery boiler, down to a level of 10–20 ppm. Typical allowed amounts of nitrogen oxide effluent are at the present 60–120 ppm. Earlier, economical use of the SCR-method was not possible due to the low temperature of the flue gas, which had been discharged from the recovery boiler and cleaned of particulate matter. The use of the SCR-process in connection with the invention is not necessary, if the removal of nitrogen oxides may be effected by some other method.

One advantage of the invention is to effect in a recovery boiler combusting waste liquid in a pulp mill an implementation in which the feed water may be heated to a relatively high temperature by means of bled steam flows of the turbine and thus increase the efficiency of electricity production (or, more exactly, the amount of electricity produced in relation to the amount of process steams, i.e., the overall electrical efficiency in back pressure production). The low-level temperature of the flue gases is then recovered into combustion air or boiler feed water. In recovery boilers, the preheating of combustion air with flue gases has been prevented by the fouling properties of the flue gases clogging conventional flue gas/air preheaters. In this invention, this problem is avoided by using a hot electrostatic precipitator, with the help of which also reduction of nitrogen oxides in the flue gases of the recovery boiler may be effected, which nowadays is also current, as so far there is no SCR catalyst available operating reliably, if the flue gases of the recovery boiler have not been cleaned of fly ash. A known solution for the operation of a SCR-catalyst, when the flue gases are fouling, is to locate a purifying apparatus for nitrogen oxides operating on an SCR-basis after a cold (120–200° C.) electrostatic precipitator so that the temperature is raised to the operating temperature of the catalyst, which is in this case about 260–330° C., by means of a regenerator and additional combustion. A disadvantage of this solution is thermal loss, which has to be compensated by fuel combustion. The lost temperature difference in the flue gases is typically 20–50° C. And further, the apparatus is expensive.

SUMMARY OF DRAWINGS

The invention is described in more detail with reference to the appended drawings, in which.

DETAILED DESCRIPTION OF INVENTION

Figure 1:
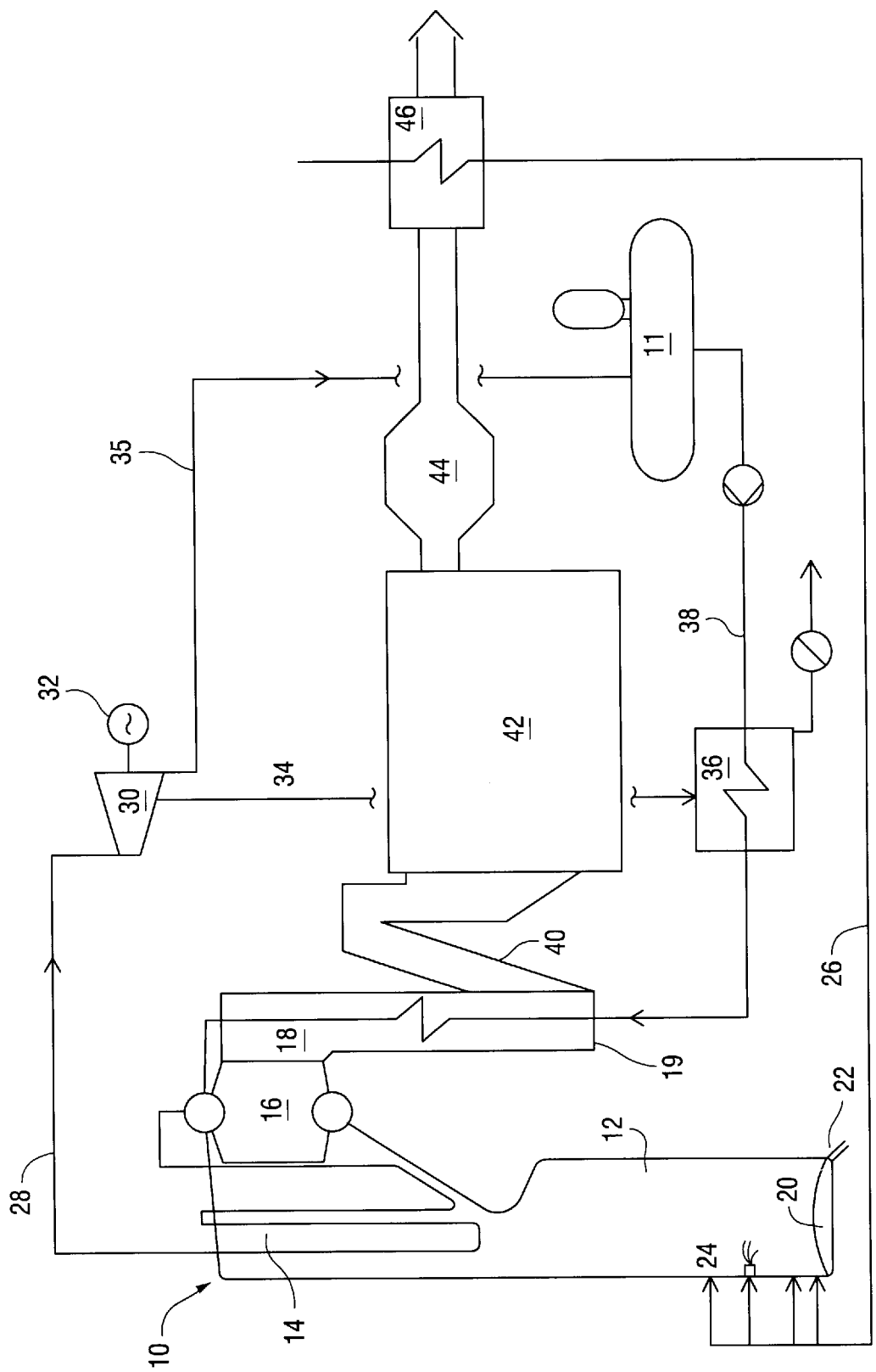
FIG. 1 illustrates a preferred arrangement according to the invention in connection with a recovery boiler and a steam turbine.

FIG. 1 illustrates a recovery boiler 10 known per se which comprises a furnace 12 and heat recovery surfaces: a superheater 14, a steam-generating bank 16 and an economizer 18. The economizer can comprise one or more economizers. Black liquor is introduced into the boiler via nozzles 24. Prior to the boiler, the black liquor has been concentrated in the evaporation plant to a dry solids content of more than 80 weight per cent, typically about 80–95 weight per cent of dry solids, preferably about 85–90 weight per cent. A preferred method of reaching such a high dry solids content in black liquor evaporation is the method described in FI patent application 974345.

Preheated combustion air is also introduced into the furnace via line 26. The excess air ratio in the combustion is low, less than 2 volume per cent, preferably 1–1.5 volume per cent. During the combustion, chemicals contained in the black liquor form a char bed 20 at the bottom of the furnace, wherefrom the chemical melt is discharged via melt spouts 22. The flue gases generated in the combustion flow past the superheater 14, the steam-generating bank 16 and the economizer 18 of the recovery boiler, whereby the heat contained in the flue gases is recovered into water flowing in the heat transfer surfaces, which water is discharged in form of superheated steam via line 28. The operating pressure of the recovery boiler is more than 80 bar, preferably about 100 bar to 120 bar. Most preferably, the operation pressure and temperature are as high as possible, determined for each process e.g. by the properties of the liquor being combusted and the operation limits of the boiler in relation to the cooling and corrosion of the furnace walls of the superheater and other constructional details of the boiler.

The superheated steam produced by the boiler is led via line 28 into the steam turbine 30, to which turbine a generator 32 is connected to produce electricity by means of energy being released in steam flashing. From turbine 30, bled steam is discharged via line 34 to a feed water preheater, i.e., heat exchanger 36, in which feed water flowing in conduit 38 is preheated by means of thermal energy obtained from the bled steam. From the turbine, a steam conduit leads via line 35 to a feed water feeding tank 11. Bled steam may be released from the turbine also via other conduits, (not shown) to other places of consumption in the mill, e.g. to the evaporation plant.

The feed water preheated in heat exchanger 36 is further led to the so-called cooler end 19 of the economizer 18 of the boiler 10, wherefrom the flue gases having reached a certain final temperature are removed from the boiler to flue gas cleaning. As known, the final temperature, due to efficiency reasons, is less than 200° C., typically 150–170° C. In the present invention, the discharge temperature of the flue gases is kept substantially higher, i.e., it is more than 250° C., typically 250–400° C., preferably more than 300–350° C. The final temperature of the flue gases is maintained by means of the feed water temperature, which is regulated in the preheater 36 by regulating the amount of bled steam 34 of the turbine introduced therein, or by arranging the preheating to have multiple stages, whereby the regulation may be effected by regulating the heating of various stages, either separately or combined, as described in the above. The temperature of the feed water after the economizer is kept by a preset value, 5–30° C., below the saturation temperature to prevent formation of detrimental stresses in the economizer and disturbances in the water circulation of the boiler due to disturbances in the operation of the drum. This temperature difference relative to boiling may be regulated by circulating feed water from the economizer outlet, e.g., to the feed water tank, whereby the steam generated due to the pressure decrease may be led from the separation vessel into the feed water tank, steam log, atmosphere etc.

After the economizer, the flue gases are led via line 40 into a hot electrostatic precipitator 42, in which fly ash particles are removed from the flue gases in a way known per se. In the next stage, nitrogen oxides are removed from the gases by means of, e.g., a catalytic cleaning method, by a so-called SCR-process known per se, in reactor 44. In this process, ammonia or aqueous ammonia is added into the gases, after which the gas flows passing a catalyst that catalyzes the SCR-reaction. The nitrogen oxides are removed from the flue gases selectively, i.e. without oxidation of the ammonia. SCR-catalysts are well known per se. The operating temperature of the SCR-process is preferably 300–350° C.

The temperature of the cleaned flue gas is still so high that according to the invention it is applicable for preheating the combustion air. In known methods for separating particulate matter from flue gases, the flue gases are treated so that after the cleaning their temperature is too low for preheating the air. Earlier, uncleaned flue gases from the boiler have been used for preheating of air, but the disadvantages of fouling of the preheater and the accompanying need for cleaning as well as reduced usability have been present. In the present invention, the cleaning of the flue gases has been effected so that the temperature of the purified gases, typically higher than 250° C., is preferably high so that the combustion air may be effectively heated in the air preheater 46 and that the preheating of the feed water is provided with abundant space. A fact that limits it is the saturated temperature of the drum; heat cannot be transferred into the feed water excessively in order to avoid boiling of the water leaving the economizer and entering the drum. More exactly, the temperature of said air will remain by 5–30° C. below the saturated temperature. The preheated air is led into the boiler via line 26 and the purified gas is led to atmosphere.

Figure 2:
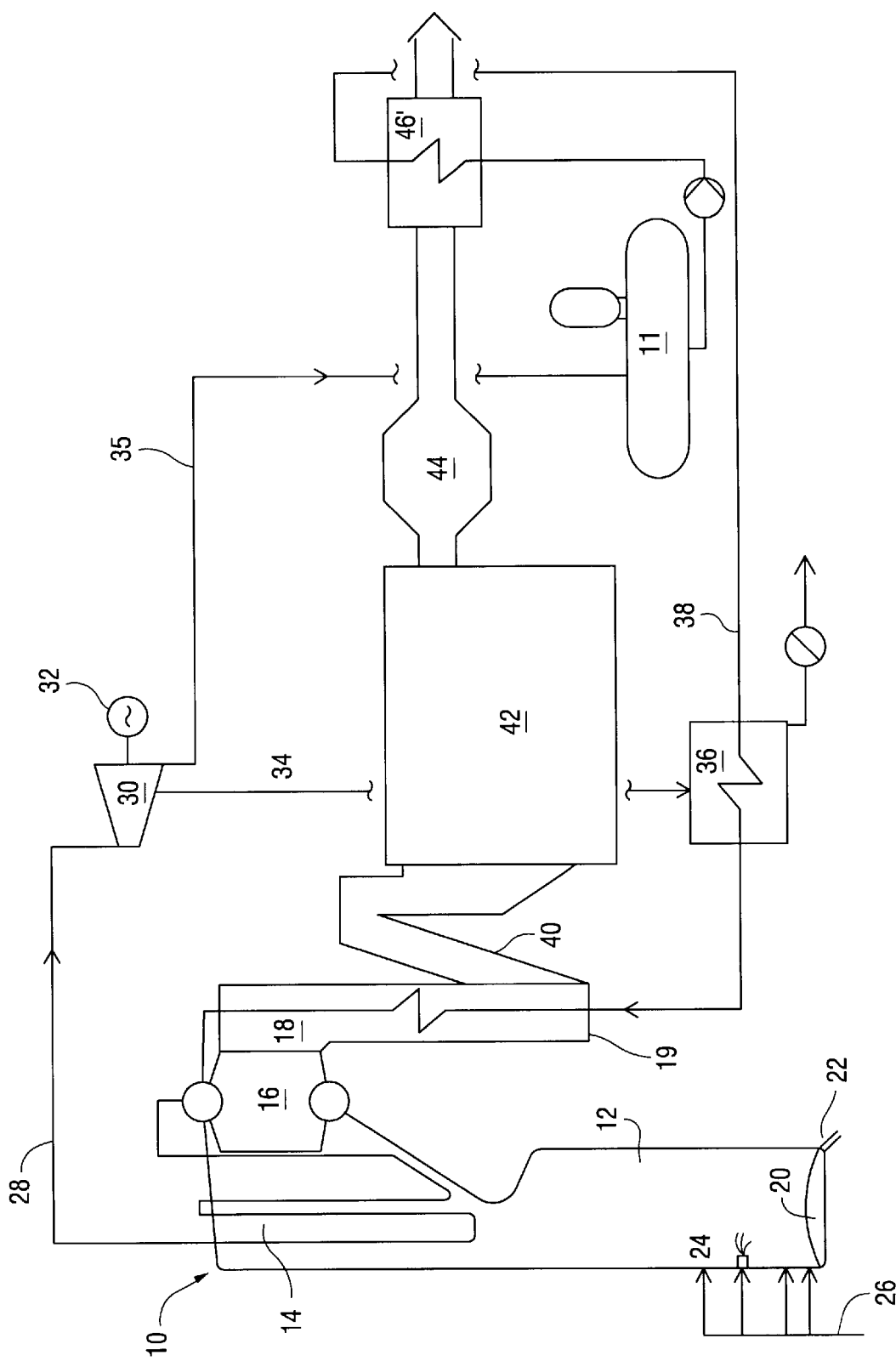
FIG. 2 illustrates another preferred arrangement according to the invention in connection with a recovery boiler and a steam turbine.

FIG. 2 shows another arrangement according to the invention, in which arrangement the recovery boiler has at least two economizers, first and second economizers, 46' and 18. The economizer 46' is a first economizer in the flow direction of the boiler feed water. The final flue gas cooling is carried out by the first economizer 46', which in this arrangement replaces the air preheater 46 of FIG. 1. From the first economizer 46' the feed water is passed into the preheater 36, which controls the temperature of the feed water entering the second economizer 18. The feed water heating in the preheater 36 is a tool with which the right operation temperature is maintained in the flue gases entering the flue gas cleaning system 42 and 44 (described in connection with FIG. 1) through line 40.

Part of the temperature control for the flue gases in line 40 can be effected in the feed water tank 11 with back pressure steam, or with extraction steam from a steam turbine, or adding a feed water preheater between the feed water tank 11 and the first economizer 46'.

Some of the advantages of the present invention include, for example:

The overall efficiency of electricity production increases, as the rise in temperature of water being fed into the boiler is high in steam-operated preheaters.

The preheating temperature of air is higher than in steam-operated solutions, boosting the circulation of low temperature heat flows and thus increasing the overall electrical efficiency.

The final temperature of the flue gas is low and thus improves the efficiency of the recovery boiler.

The SCR-apparatus operates having its normal temperature and gases, wherefrom over 99% of particulate matter have been removed.

While the invention has been described in connection with what is presently considered to be the most practical and preferred embodiment, it is to be understood that the invention is not to limited to the disclosed embodiment, but on the contrary, is intended to cover various modifications and equivalent arrangements included within the spirit and scope of the appended claims.

What is claimed is:

1. In a method for production of electric energy in a boiler plant of a pulp mill, said method comprising:

feeding black liquor having a dry solids content of more than 80% and combustion air into a furnace of a recovery boiler for combusting the black liquor and recovering chemicals contained therein, flue gases generated in the combustion of the black liquor flow to an economizer of the recovery boiler, in which economizer feed water for the boiler is heated, and the flue gases flow from the economizer to a gas cleaning device, feed water flows from the economizer to a steam-generating bank at a temperature below a saturation temperature of the water, and further the water flows to a superheater to produce steam having a pressure of more than 80 bar, steam from at least the steam generating bank flows from the recovery boiler to a steam turbine to produce electricity, steam discharged from the steam turbine preheats the feed water flowing into the economizer, wherein the temperature of the feed water flowing into the economizer is regulated by bleed steam of the turbine so that the flue gases exit the economizer at a temperature of more than 250° C. and that after the economizer the flue gases are cleaned in at least a hot electrostatic precipitator and the cleaned flue gases are cooled by the combustion air or the feed water.

2. A method according to claim 1, wherein after the hot electrostatic precipitator the flue gases are cleaned with a SCR-process.

3. A method according to claim 1, wherein steam having a pressure in a range of 90 bar to 140 bar is produced in the boiler.

4. A method according to claim 1, wherein steam in a pressure range of 100 bar to 120 bar is produced in the boiler.

5. A method according to claim 1, wherein the dry solids content of the black liquor is in a range of 80–95 weight per cent.

6. A method as in claim 1, wherein the dry solids content of the black liquor is in a range of 85–90 weight per cent.

7. A method according to claim 1, wherein that the flue gases exit the economizer at a temperature in a range of 250–400° C.

8. A method according to claim 3, wherein the flue gases are treated in the hot electrostatic precipitator at a temperature in a range of 250–400° C.

9. A method according to claim 1, wherein the flue gases exit the economizer at a temperature in a range of 300° C. to 350° C.

10. A method according to claim 9 wherein the flue gases are treated in the hot electrostatic precipitator at a temperature in a range of 300° C. to 350° C.

11. An arrangement in a boiler plant of a pulp mill, comprising:
   a recovery boiler having a furnace, conduits for feeding black liquor and combustion air into the furnace, a superheater, a steam discharge line connected to the superheater, an economizer, a conduit for introducing feed water into the economizer and a conduit for discharging flue gas from the economizer;
   a steam turbine connected to the steam discharge line of the boiler and having at least one conduit for discharging bled steam;
   a preheater for feed water connected to the feed water introduction conduit;
   a hot electrostatic precipitator having feed and at least one discharge conduit for flue gas; and
   a preheater for air connected to the combustion air feed conduit of the furnace;
wherein the feed water preheater is connected to the discharge conduit for discharging bled steam of the steam turbine, the flue gas feed conduit of the hot electrostatic precipitator is connected to the flue gas discharge conduit of the economizer of the boiler, and that the preheater for air is connected to the flue gas discharge conduit of the hot electrostatic precipitator.

12. An arrangement according to claim 11, wherein an SCR-gas cleaning device is connected between the hot electrostatic precipitator and the preheater for air in the flue gas line.

13. An arrangement in the boiler plant of a pulp mill comprising
   a recovery boiler having a furnace, conduits for feeding black liquor and combustion air into the furnace, a superheater, a steam discharge line connected to the superheater, at least a first and second economizer in the flow direction of the feed water, and a conduit for discharging flue gas from the second economizer;
   a steam turbine connected to the steam discharge line of the boiler and having at least one conduit for discharging bled steam;
   a preheater for feed water, and
   a hot electrostatic precipitator having feed and at least one discharge conduit for flue gas;
   wherein that the feed water preheater is connected to the discharge conduit for discharging bled steam of the steam turbine and is disposed between the first and second economizer so that the feed water flows from the first economizer to the second economizer, and further wherein the flue gas feed conduit of the hot electrostatic precipitator is connected to the flue gas discharge conduit of the second economizer and that the first economizer is connected to the flue gas discharge conduit of the hot electrostatic precipitator.

14. An arrangement according to claim 13, wherein the SCR-gas cleaning device is connected between the hot electrostatic precipitator and the first economizer in the flue gas line.

* * * * *